UNITED STATES PATENT OFFICE.

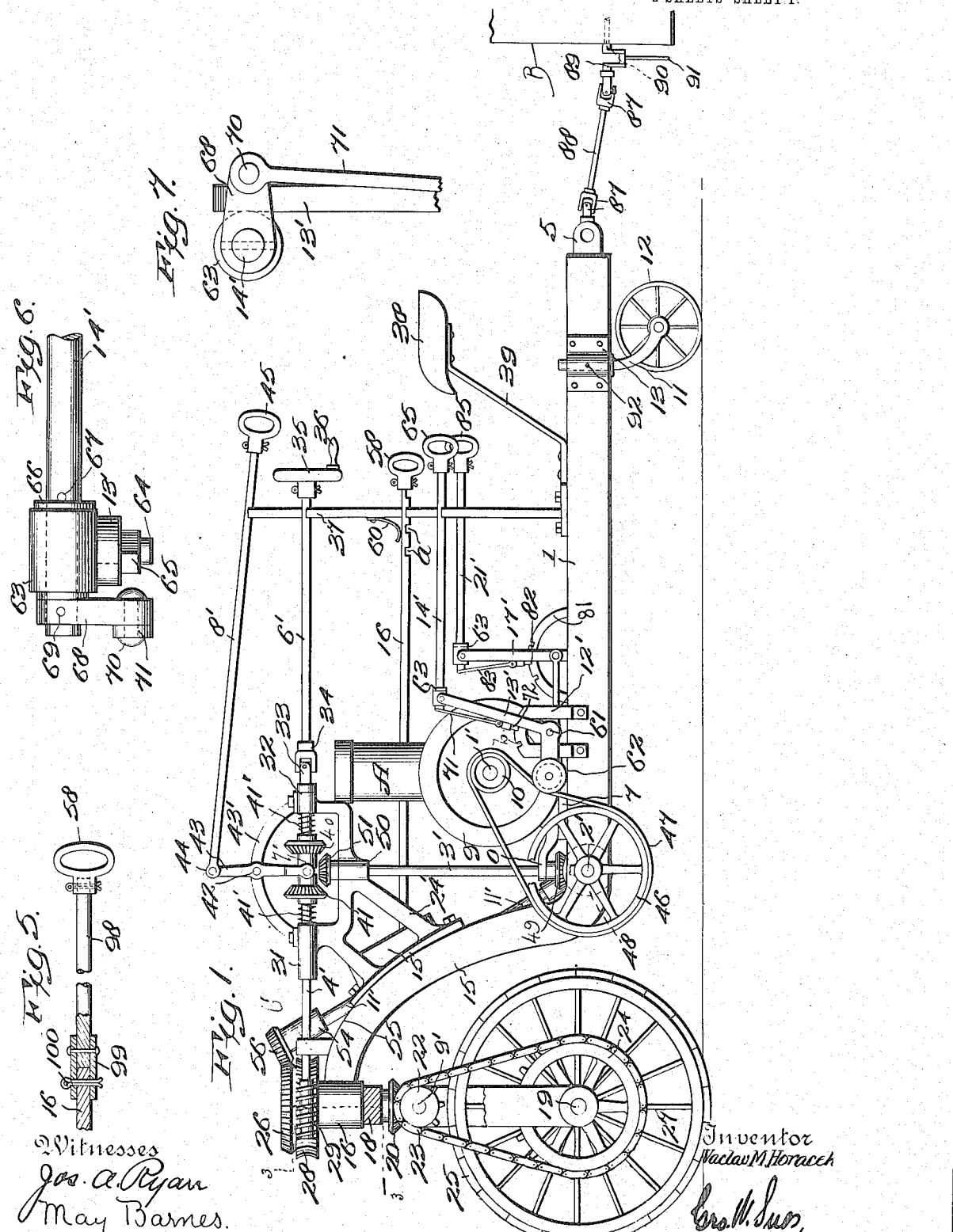
V. M. HORACEK.
TRACTION ENGINE ATTACHMENT.
APPLICATION FILED MAY 26, 1913.
1,129,291. Patented Feb. 23, 1915.
2 SHEETS—SHEET 1.
Witnesses
Jos. A. Ryan
May Barnes.
Inventor
Vaclav M. Horacek
Attorney

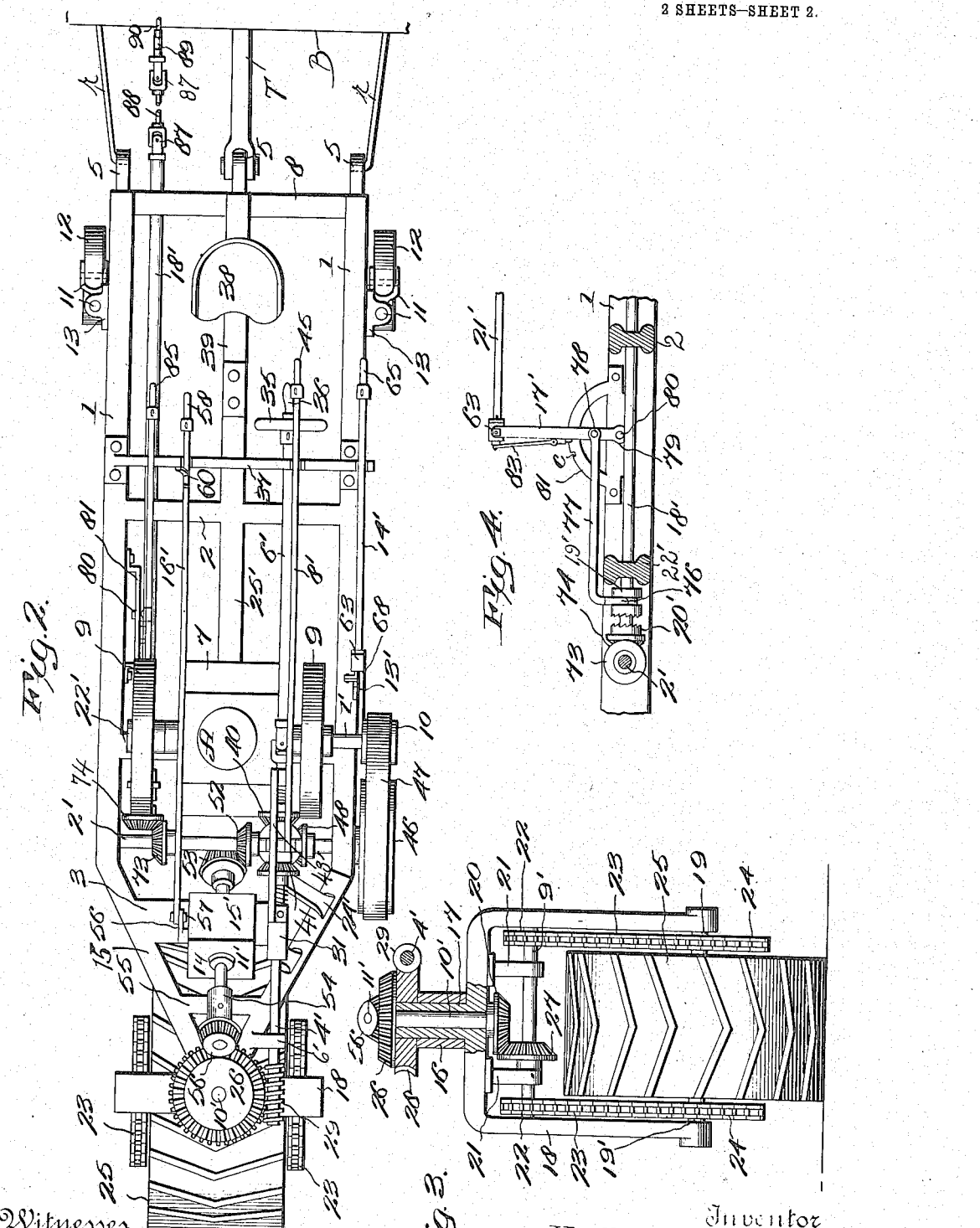

VACLAV M. HORACEK, OF TABOR, SOUTH DAKOTA.

TRACTION-ENGINE ATTACHMENT.

1,129,291. Specification of Letters Patent. Patented Feb. 23, 1915.

Application filed May 26, 1913. Serial No. 769,868.

*To all whom it may concern:*

Be it known that I, VACLAV M. HORACEK, a citizen of the United States, and a resident of Tabor, in the county of Bonhomme and State of South Dakota, have invented certain new and useful Improvements in Traction-Engine Attachments, of which the following is a specification, reference being had to the accompanying drawings.

This invention relates to improvements in traction and driving attachments for agricultural machines or other power operated devices, and the primary object of my invention is to provide a single drive wheel tractor especially adapted to be used in connection with self binders, arranged to enable the operator to turn the tractor at right angles. The instrumentalities are further so arranged that one operator can guide and control both the tractor and the implement drawn by the tractor.

A further object is to provide a special hitch so that the tractor may be secured to an ordinarily constructed self binder, enabling the binder being run by the motive power of the tractor.

A further object is to construct a tractor including instrumentalities so arranged that on straight runs, that is, where no corners are to be turned, the bull wheel of the binder may be thrown into connection with the driving mechanism of the binder so that the bull wheel will be driven by the engine of the tractor. In going up grade or where the soil is very moist, this arrangement forms an important feature of my invention.

Another object is to provide a tractor with coupling rods so arranged that the same may be extended to a point in front of the operator's seat upon the self binder or any other implement drawn by the tractor.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification and in which like numerals of reference indicate similar parts in the several views: Figure 1, shows a side elevational view of a tractor constructed according to my invention. Fig. 2, is a top view of the tractor. Fig. 3, is a section on line 3, 3, of Fig. 1. Fig. 4, shows an enlarged broken detail of the auxiliary driving shaft and the means employed to couple the same to the main shaft. Fig. 5, is an enlarged detached detail disclosing an extension rod secured to one of the operating members as used in my invention. Fig. 6, shows a top view of the starting rod showing the method of operating the detent. Fig. 7, is an end view of Fig. 6.

My present invention relates to a tractor especially adapted to be used on a farm in drawing agricultural implements and vehicles, or to drive any farm machinery such as a corn sheller, grain elevator, and the like.

I have designed and shown in the present invention a tractor especially constructed to be used in connection with a self binder as ordinarily constructed.

My invention includes a transmission gear of conventional construction, embracing two forward speeds and one reverse.

There is a special advantage in using my tractor in connection with a self binder, in that in passing over moist soil or where the grain is particularly heavy, the speed of the tractor is reduced, so that the liability of the binder choking is entirely eliminated. It is of course understood that in my present invention the binder mechanisms are driven by the engine carried by the tractor.

Another important feature in the use of my tractor in connection with a self binder, lies in the fact that the bull wheel of the self binder simply serves to support the binder. Under these conditions the slipping of the bull wheel or the slipping even of the main tractor wheel will not interfere with the operation of the binder. The instrumentalities are so arranged that when the self binder is hitched to my tractor, the bull wheel of the binder is disconnected, for the reason that the binder mechanism, as has been set forth, is driven by the motive power carried by the tractor. The bull wheel of the self binder however can be instantly thrown into connection again with the binder mechanism, so that the binder can be drawn by draft animals when the tractor is disconnected from the bull wheel, it is of course understood that as conventionally constructed it is simply necessary to operate the clutch.

The special advantage in connection with my present invention resides in the fact that the rear supporting wheels do not have to be taken off the tractor. Under this condition the self binder will be free of any weight from the tractor, and can be easily balanced up and down.

As disclosed in Fig. 1, the frame members 1 end in front in the upstanding and forwardly curved frame portions 15, which terminate in the bearing head 16. Revolubly held within this bearing head 16, as shown in Fig. 3, is the hollow neck 17 of the wheel carrying yoke 18, this yoke at its lower end giving support to the axle 19. Passing through and revolubly held within the neck 17, is the stub shaft 10', which at its upper end carries the gear wheel 26, and at its lower end gives support to the bevel pinion 20, these gear members serving to hold the stub shaft in place. As shown in Fig. 3, the bearing head rests upon the yoke 18. Secured to the under surface of the yoke are the oppositely positioned hangers 21, giving support to the chain gear shaft 9'; this shaft at each end carrying the chain gears 22, these chain gears holding the chains 23, which at their lower ends pass over the chain gears 24. The chain gears 24 are more clearly shown in Fig. 1, and are carried upon the axle 19, this axle having keyed to it the tractor wheel 25. The chain gear shaft 9' has keyed to it the bevel gear 27, which meshes with the bevel gear 20, this construction being clearly shown in Fig. 3. Interposed between the bevel gear 26 and the bearing head 16 is a worm gear 28, and operating in conjunction with this worm gear is the worm, 29, fixed to the worm shaft 4', at its forward end held within the bearing 6'.

As shown in Fig. 2, I have secured to one of the upstanding frame portions 15 a bearing bracket 24'. This bracket has the bearing sleeve 31, within which is revolubly held the worm shaft 4', and in alinement with this bearing sleeve 31, is the bearing 32, the worm shaft 4' extending through said bearing 32, as shown in Fig. 1. The worm shaft 4' ends in the coupling head 33, arranged to receive the coupling 34 to which is secured the steering shaft 6', carrying the steering wheel 35, having the operating handle 36. At its rear end this steering shaft 6' is loosely held within a carrying frame 37, this frame being positioned immediately in front of the operator's seat 38, which is secured to the brace 39 bolted to the central beam 25, as shown in Figs. 1 and 2.

Slidably held upon the worm shaft 4' and splined thereto is the gear sleeve 7', at one end carrying the bevel gear 40 and at the opposite end carrying the bevel gear 41. Interposed between the bevel pinions 41 and 40, as shown in Fig. 1, are the coil springs 41', so that this gear sleeve 7' is yieldingly held in position.

Spanning from the bearing sleeve 31 to the bearing 32, is the curved bracket 43' carrying the pivot pin 42, giving pivotal support to the rock lever 43, this rock lever striding the gear sleeve as shown in Fig. 1. By means of this rock lever the gear sleeve may be reciprocated backward and forward. Secured to a pin 44 carried at the upper end of the rock lever 43, is the throw rod S', which is also held removably within a suitable notch of the carrying frame 37, and ends in the operating handle 45, this construction being clearly shown in Fig. 1. As disclosed, the operating handle 45 is held in front of and to the left of the driver's seat 38.

Extending transversely through the frame members 1, is the main shaft 2', which at its outer end carries the belt pulley 46, over which passes the driving belt 47, this belt also passing over the driving pulley 10. Secured near one end to this main shaft 2', is the pinion 48, and this pinion is arranged to mesh with a pinion 49, shown in Fig. 1, secured to the lower end of the steering shaft 3'. At its lower end this steering shaft is held within the bracket O, while at its upper end the shaft rotates within the centrally disposed bearing 50 of the bearing bracket 24', this construction being clearly shown in Fig. 1. At its upper end the steering shaft 3' carries the pinion 51, and this pinion is arranged to be engaged by the gears 40 and 41, for a purpose as will be described more clearly hereinafter.

Secured to the main shaft 2', approximately mid length, is the bevel pinion 52, shown in Fig. 2, this pinion being normally in mesh with the pinion 53 secured to the lower end of the transmission shaft 11'. This shaft 11' at its upper end is revolubly held within a suitable collar 54, carried by the bracket 55 and has keyed to it at its upper end the bevel pinion 56. This pinion 56 is normally in engagement with the bevel gear 26. The shaft 11' is secured to and forms part of a suitable transmission gear of any approved selective sliding gear type, and in the drawings the casing 14 merely is shown inclosing the transmission gear. In my invention I prefer using a transmission gear having two forward speeds and one reverse.

The transmission gear, as used in my invention, is provided with a crank 56 carrying the pin 57, to which is secured the operating rod 16', terminating at its rear end in the operating handle 58. This operating rod is also slidably and removably held within the carrying frame 37, the operating handle 58 being positioned in front of and proximal to the seat. The rear end of the operating rod 16' is round and has the notches a, arranged to engage the edge of the frame 37 within the supporting frame. A spring 60 is secured to the frame 37 and arranged to normally hold the operating rod 16' in locked condition. In throwing out the transmission gear or throwing in the reverse or forward speeds, the operator simply gives the operating handle 58 a half turn, so that the notches a, are carried out of engagement. This then permits the operating rod being shoved backward or forward in operating the transmission gear.

Secured to one of the side frame members 1, shown in Fig. 1, is the notched bracket 12', having the notches b, and carrying the pintle 61, this pintle giving pivotal support to the bell crank 13', which at its lower end carries the grooved sheave 62, and at its upper end has a bearing sleeve 63. This construction is more clearly shown in Fig. 6. The sleeve 63 has the extending pin 64 passing through an opening within the upper end of the bell crank 13', the sleeve being pivotally held in position by means of the nut 65.

Revolubly held within the sleeve 63, is the starting rod 14', ending in the operating handle 65, this starting rod also being removably held within a suitable opening within the frame 37, and being located in front of and proximal to the driver's seat 38. Secured to this starting rod 14' is the washer 66, held in place by means of the pin 67, this washer working against one end of the sleeve 63. Working against the opposite end of this sleeve 63 is the crank 68, secured by means of the pin 69, and this crank at its outer ends carries the bolt 70 to which is pivotally secured the rod 71, which at its lower end carries a spring actuated detent 72 arranged to be thrown into the notches b. In order to throw the bell crank 13' backward or forward, it is necessary to first give the operating handle 65 a turn to actuate the crank 68, to raise the rod 71 and the detent 72, and holding the detent out of engagement with the slot. When thrown forward the sheave 62 is free of the driving belt 47, but when the bell crank 13' is thrown rearward, as shown in Fig. 1, the belt 47 is securely tightened so that the driven pulley 46 will be actuated. On disengaging the sheave 62 from the belt, the main shaft 2' is stopped. From this it will be understood that in order to start the tractor, the operator pulls the starting rod 14' rearward to tighten the belt 47. The tractor can be instantly stopped in loosening the belt 47.

As shown in Fig. 2, the main shaft 2' at the end opposite the driven pulley 46, is provided with the driving pinion 73, this pinion 73 being normally in engagement with the pinion 74, shown in Fig. 4, and forming a part of the loosely running ratchet faced pinion 20', held to the auxiliary driving shaft 18', this shaft being held within suitable bearings within the transverse members 22' and 2.

Splined to the auxiliary driving shaft 18', is the ratchet faced sleeve 19', and striding this ratchet faced sleeve which has a receiving groove, is the fork 76 of the striding bar 77, which has its end secured by means of a suitable pin 78 to the link 17'. This link is carried upon a suitable pintle 80, shown in Fig. 4, which is carried within the frame 1. This frame has the notched sector 81, into the notches c, of which is arranged to slide a detent 82, which is spring actuated and is secured to the end of the rod 83. This rod 83 is secured exactly as is the rod 71, described as working into the notches b, the construction being shown in Figs. 6 and 7.

Arranged to actuate the rod 83 is the push rod 21', shown in Fig. 1, which at its rear end carries the operating handle 85. This push rod 21' is also given a turn in order to release the detent 82 in operating the ratchet faced sleeve 19'. The auxiliary shaft 18' extends to the rear of the machine, as shown in Fig. 2, and carries the vehicle coupling 87. The loosely running ratchet faced pinion 20' is rotated as long as the main shaft 2' is rotated, and the auxiliary shaft 18' can at any time be thrown into operation in bringing the sleeve 19' into engagement with the pinion 20'.

In Fig. 2, I have shown a square rod 88 connecting the knuckles 87, and this rod is shown as engaging the pitman crank 89 secured to the shaft 90. In this instance, this shaft 90 represents the pitman shaft of a suitable self binder, from which is shown as extending the pitman rod 91, leading to the sickle of the self binder.

In Fig. 1, I have shown the tractor as specially constructed with a view of using the same in connection with an ordinarily constructed self binder. When the binder B, is hitched to the tractor, a stub tongue T, of the binder is secured to the rear beam 8 of the tractor, while the usual brace rods r, extending from the binder are secured to the ends 5 of the side frame members 1. A hole 92 through bearings 13, and stub shafts 11 is to receive a suitable pin so the caster wheels 12 may be keyed not to swivel when the tractor is not in use with the self binder. But when the binder is hitched to the tractor then the rear supporting caster wheels 12 must swing when the tractor and the binder are turned at right angles.

Where the tractor is secured to a self binder, the operator does not use the seat 38, but places himself upon the usual seat provided upon the self binder. As the operating handles 45, 58, 65 and 85 and the steering wheel 35 would then be out of reach of the operator, I employ suitable extending rods 98, shown in Fig. 5, which ends in the collars 99, so that by means of these extension rods 98, the handles may be brought immediately in front of the operator. In Fig. 5, an extension rod is shown as secured to the operating rod 16', the handle 58 being in this instance secured by means of a suitable cotter pin to the extending rod 98. The collars or hubs 99 are secured to the ends of the tractor bars by means of suitable cotter pins 100. From the foregoing it will be seen that the operator, where the tractor is secured to a self binder, can place himself upon the usual seat provided for the operator and steer the tractor in a manner enabling the self binder to turn corners at right angles without having to back up the binder. Where the self binder is hitched to the tractor, the self binding mechanism is not driven by the bull wheel of the self binder, but is driven by the power of the engine A. In order to throw the binding mechanism into or out of operation, it is simply necessary to rock the link 17' in a proper direction. This construction then enables the operator to actuate the sickle while the self binder is stationary. The machine is steered by means of the wheel 35. However, when a quick turn is to be made, as when the tractor is turned at right angles, the operator throws one of the gears 40 or 41, into mesh with the pinion 51, so that the worm shaft 4' is actuated, resulting in the yoke carrying the main traction wheel being promptly turned.

By means of a traction and driving attachment constructed as herein shown and described, it will be seen that the same may be readily attached to any kind of agricultural machine or vehicle and the same drawn along and the operating mechanism thereof driven.

Various changes in the form, proportion and the minor details of construction may be resorted to without departing from the principle or sacrificing any of the advantages of the invention as claimed.

Having thus described my said invention, what I claim as new and desire to secure by United States Letters Patent is:—

In a traction and driving attachment of the character described, the combination of a horizontally disposed frame having a forwardly and upwardly curved end terminating in a vertical journal bearing, a yoke journaled in the bearing of said forwardly and upwardly curved end of said frame, a wheel carried by said yoke, a worm gear splined to the journal of said yoke above said bearing, a worm in constant mesh with said worm gear, a horizontal shaft splined to said worm and extending rearwardly, spaced beveled pinions slidably splined to said shaft intermediate of its ends, an upstanding bracket secured to one of said forwardly and upwardly curved ends of said frame, bearing sleeves formed on said bracket in spaced relation to the rear faces of said spaced beveled pinions, springs coiled around said shaft between the rear faces of said bevel pinions and adjacent faces of said bearing sleeves, a bevel gear disposed between and in alinement with said bevel pinions, a vertically disposed shaft splined to said gear and journaled on said frame and bracket, a bevel pinion splined to the opposite end of said shaft, a bevel gear meshing with said bevel pinion, a horizontal shaft journaled laterally of said frame, power transmitting means secured to said shaft, and manually operatable means for simultaneously shifting said bevel pinions into and out of engagement with said bevel gear.

In testimony whereof I affix my signature, in the presence of two witnesses.

VACLAV M. HORACEK.

Witnesses:
J. A. WAGNER,
F. J. FRANA.